US009569573B1

United States Patent
Jacobi et al.

(10) Patent No.: US 9,569,573 B1
(45) Date of Patent: Feb. 14, 2017

(54) RAS EVALUATION FOR CIRCUIT ELEMENT

(71) Applicant: International Business Machines Corporation, Armonk, NY (US)

(72) Inventors: Christian Jacobi, West Park, NY (US); Udo Krautz, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/062,699

(22) Filed: Mar. 7, 2016

Related U.S. Application Data

(63) Continuation of application No. 14/923,633, filed on Oct. 27, 2015.

(51) Int. Cl.
*G06F 17/50* (2006.01)
*H03M 13/00* (2006.01)

(52) U.S. Cl.
CPC ...... *G06F 17/5045* (2013.01); *H03M 13/6575* (2013.01)

(58) Field of Classification Search
CPC .................................................. G06F 17/5022
USPC ......................................................... 716/106
See application file for complete search history.

(56) References Cited

U.S. PATENT DOCUMENTS

| | | |
|---|---|---|
| 6,014,505 A | 1/2000 | Schorn |
| 6,425,110 B1 | 7/2002 | Hathaway et al. |
| 7,143,329 B1 * | 11/2006 | Trimberger .... G01B 31/318519 326/38 |
| 7,895,552 B1 | 2/2011 | Singhal et al. |
| 8,577,717 B2 | 11/2013 | Fu et al. |

OTHER PUBLICATIONS

Jacobi et al., "RAS Evaluation for Circuit Element", U.S. Appl. No. 14/923,633, filed Oct. 27, 2015, 30 pages.
IBM, "List of IBM Patents or Patent Applications Treated as Related", Appendix P, 2 pages, dated Mar. 7, 2016.

* cited by examiner

*Primary Examiner* — Suresh Memula
(74) *Attorney, Agent, or Firm* — Edward J. Wixted, III; Steven L. Fisher-Stawinski

(57) ABSTRACT

A computer-implemented method includes identifying an electronic circuit, which includes a plurality of circuit elements and is based on a circuit design. The circuit design includes structural information and logical information. The method generates a first verification model for the circuit design. The verification model includes a plurality of error report signal paths for each of the plurality of circuit elements. The method identifies a first circuit element output based on the plurality of error report signal paths. The method sets output for at least one of the first plurality of circuit elements to a fixed value. The method generates a second circuit element output based on the plurality of error report signal paths and setting output for at least one of the first plurality of circuit elements to a fixed value. The method determines a difference between the first circuit element output and the second circuit element output.

6 Claims, 6 Drawing Sheets

RAS EVALUATION FOR CIRCUIT ELEMENT

BACKGROUND

The present invention relates generally to the field of circuits, and more particularly to reliability, availability, and serviceability (RAS) features.

Reliability, availability, and serviceability (RAS) describes the robustness of mainframe computers. RAS features protect the data integrity of computers and help computers operate without failure and/or error states for longer periods of time. For example, RAS features such as parity bits, error-correcting codes (ECC), and Berger-codes may be implemented within a mainframe computer design block and may detect errors within the computer. However, RAS features take up physical space within the design block in addition to requiring resource and power for operation. Often, the efficiency of these RAS features is based on whether or not the RAS feature correctly identifies an error. Computer engineers continue to face difficulties evaluating the efficacy of such RAS features.

SUMMARY

A computer-implemented method includes identifying an electronic circuit, which includes a plurality of circuit elements and is based on a circuit design. The circuit design includes structural information and logical information. The method generates a first verification model for the circuit design. The verification model includes a plurality of error report signal paths for each of the plurality of circuit elements. The method identifies a first circuit element output based on the plurality of error report signal paths. The method sets output for at least one of the first plurality of circuit elements to a fixed value. The method generates a second circuit element output based on the plurality of error report signal paths and setting output for at least one of the first plurality of circuit elements to a fixed value. The method determines a difference between the first circuit element output and the second circuit element output. A corresponding computer program product and computer system are also disclosed.

DETAILED DESCRIPTION

Figure 1:
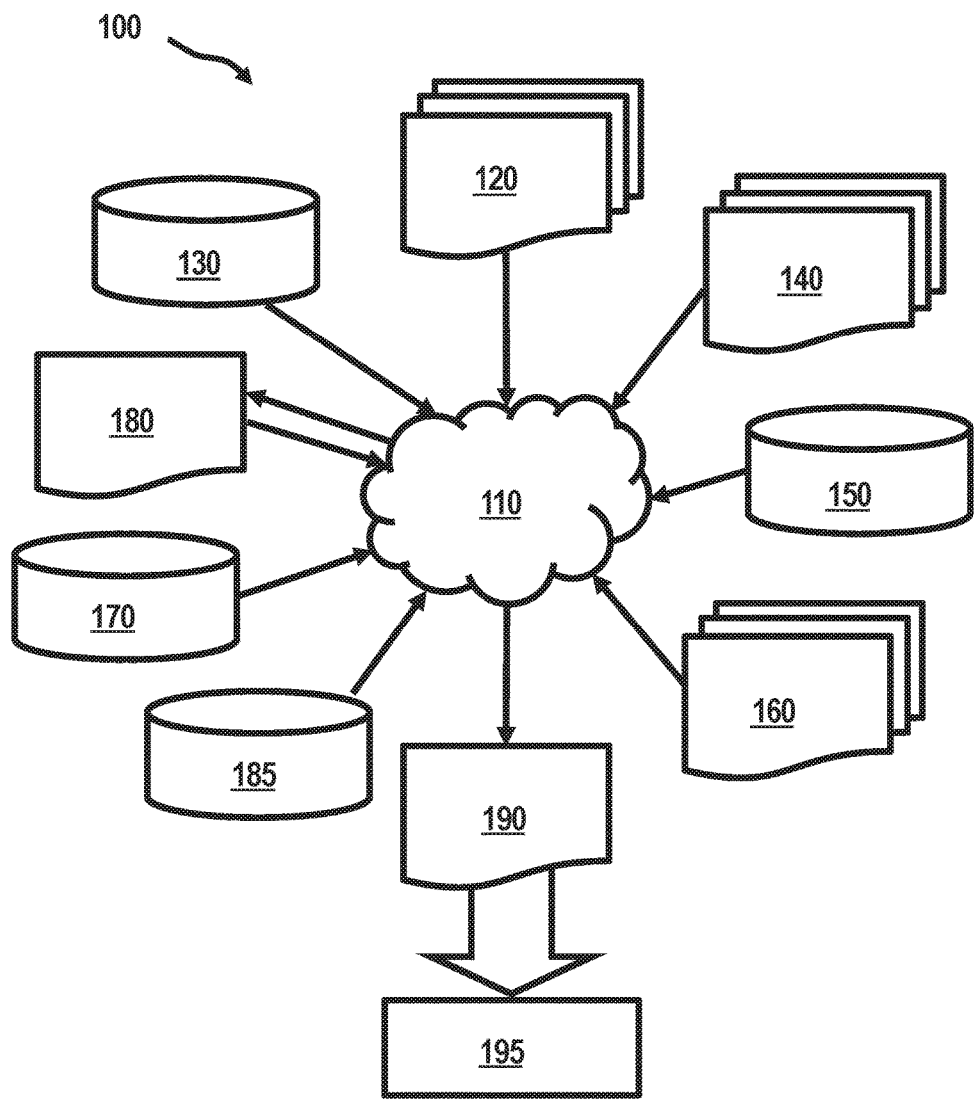
FIG. 1 is a block diagram illustrating an exemplary design flow of an integrated circuit, in accordance with at least one embodiment of the invention.

FIG. 1 is a schematic block diagram illustrating an exemplary design flow of an integrated circuit, in accordance with at least one embodiment of the invention. The exemplary design flow 100 may be used for semiconductor IC logic design, simulation, test, layout, and/or manufacturing. The design flow 100 includes processes, machines and/or mechanisms for processing design structures or devices to generate logically or otherwise functionally equivalent representations of design structures and/or devices. The design flow 110 may include a logical information. The logical information may include virtual logical information, which is accessed remotely via a network, and/or stored within the design flow 100. The design structures and/or devices to be processed and/or generated by the design flow 100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may be lithography machines, machines and/or equipment for generating masks (e.g., e-beam writers), computers and/or equipment for simulating design structures, any apparatus used in a manufacturing or test process, or any machines for programming functionally equivalent representations of the design structures and/or devices into any medium (e.g., a machine for programming a programmable gate array).

Structural informational about the electronic circuit includes data about how electrical components within the electronic circuit are interconnected. For examples, structural information may include how batteries, resistors, inductors, capacitors, are organized and interconnect within the circuit. For example, structural information may include whether circuit elements are connected in series or in parallel.

Logical information about the electronic circuit includes data about how the circuit performs responsive to logical input and information about the logical input itself. For example, logical information may include logical gates, switches, or Boolean functions. Structural information and logical information encompasses data relating to the electrical circuit components and their operation. Structural information and/or logical information may be stored virtually. In such an embodiment, the structural information and/or logical information may be stored within a cloud-based environment suitable for access by a model program and the electronic circuit.

The exemplary design flow 100 may vary depending on the type of representation being designed. For example, a design flow for building an application specific IC (ASIC) may differ from a design flow for designing a standard component and may differ still from a design flow 100 for instantiating a design into a programmable array. In such an example, a programmable gate array (PGA) or a field programmable gate array (FPGA) may be offered by Altera® Inc. or Xilinx® Inc.

FIG. 1 includes an input design structure 120. The input design structure 120 is processed by a design process 110. The input design structure 120 may be a logical simulation design structure generated and processed by the design process 110 to produce a logically equivalent functional representation of a hardware device. The input design structure 120 may also and/or alternatively include data and/or program instructions, that when processed by the design process 110, generate a functional representation of a physical structure of a hardware device (not illustrated). The functional representation of the physical structure may be representing functional and/or structural design features. The input design structure 120 may be generated using an electronic computer-aided design (ECAD). The input design structure 120 may be implemented responsive to developer and/or designer input. When encoded on a machine-readable data transmission, gate array, or storage medium, the input design structure 120 may be accessed and processed by one or more hardware and/or software modules within design process 110 to simulate or otherwise functionally represent an electronic component, circuit, electronic or logic module, apparatus, device, or system. As such, the input design structure 120 may include files and/or other data structures including human and/or machine-readable source code, compiled structures, and computer-executable code structures. The input design structure 120 may be processed by a design and/or simulation data processing system, to functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

The input design structure 120 may include a first and/or second formal computer-implemented verification model program of the respective design of the electronic circuit and/or logical sub-blocks. The respective verification model program provided by the input design structure 120 may be generated, accessed and processed by one or more hardware and/or software modules within the design process 110 to determine the number of circuit elements dedicated to circuit reliability in a design of an electronic circuit at the register-transfer level.

Design process 110 may incorporate hardware and/or software modules for synthesizing, translating, or otherwise processing a design/simulation functional equivalent of the components, circuits, devices, or logic structures to generate a netlist 180. The netlist 180 may contain design structures such as input design structure 120. The netlist 180 may include, for example, compiled or otherwise processed data structures representing a list of wires, discrete components, logic gates, control circuits, I/O devices, models, etc. that describe connections to other elements and circuits in an integrated circuit design. Netlist 180 may be synthesized using an iterative process in which the netlist 180 is resynthesized one or more times depending on design specifications and parameters for the device. The netlist 180 may be recorded and/or stored on a machine-readable data storage medium. The netlist 180 may be programmed into a programmable gate array. The machine-readable data storage medium may be a non-volatile storage medium such as a magnetic or optical disk drive, a programmable gate array, a compact flash, or other flash memory. The machine-readable data storage medium may be a system memory, a cache memory, a buffer space, an electrically conductive device, an optically conductive device, and/or materials on which data packets may be transmitted and intermediately stored via the Internet, or other networking suitable means.

Design process 110 may include hardware and software modules for processing a variety of input data structure types including netlist 180. Such data structure types may reside, for example, within library elements 130 and include elements, circuits, and devices. Devices may include models, layouts, and symbolic representations, for different manufacturing technologies (e.g., different technology nodes, 32 nm, 45 nm, 10 nm, etc.). The data structure types may include design specifications 140, characterization data 150, verification data 160, design rules 170, and test data files 185 which may include input test patterns, output test results, and other testing information. Design process 110 may include, for example, standard mechanical design processes such as stress analysis, thermal analysis, mechanical event simulation, process simulation for operations such as casting, molding, and die press forming, etc. One of ordinary skill in the art can appreciate the extent of possible mechanical design tools and applications used in design process 110 without deviating from the scope and spirit of the invention. Design process 110 may also include modules for performing standard circuit design processes such as timing analysis, verification, design rule checking, place and route operations, etc.

Design process 110 may employ and incorporate logic and physical design tools such as HDL compilers and simulation model program build tools to the input design structure 120. The design process 110 may process the input design structure 120 by communicating with supporting data structures and/or additional mechanical designs or data (if applicable). The design process 110 may communicate with supporting data structures and/or additional mechanical designs or data to generate a second design structure 190. The second design structure 190 may reside on a storage medium or programmable gate array in a data format used for the exchange of data of mechanical devices and structures (e.g., as information stored in an IGES, DXF, Parasolid XT, JT, DRG, or any other suitable format for storing and/or rendering such mechanical design structures).

Similar to the input design structure 120, the second design structure 190 may include one or more files, data structures, or other computer-encoded data. The second design structure 190 may include instructions. Instructions may reside on a transmission or data storage media and that when processed by an ECAD system generate a logically or otherwise functionally equivalent form of one or more of the embodiments. In one embodiment, the second design structure 190 may include a compiled, executable HDL simulation mode that functionally simulates the devices.

The second design structure 190 may utilize a data format used for an exchange of layout data of integrated circuits and/or symbolic data format (e.g., information stored in a GDSII (GDS2), GL1, OASIS, map files, or any other suitable format for storing such design data structures). The second design structure 190 may include information such as symbolic data, map files, test data files, design content files, manufacturing data, layout parameters, wires, levels of metal, vias, shapes, data for routing through the manufacturing line, and any other data required by a manufacturer or other designer/developer to produce a device or structure. At stage 195 where the second design structure 190 may proceed to tape-out, may be released to manufacturing, may be released to a mask house, may be sent to another design house, may be sent back to the customer, etc.

A method as described above may be used in a fabrication of integrated circuit chips. The integrated circuit chips may be distributed by a fabricator in raw wafer form (that is, as a single wafer that has multiple unpackaged chips), as a bare die, or in a packaged form. In the latter case, the integrated circuit chip may be mounted in a single chip package (such as a plastic carrier, with leads that are affixed to a motherboard or other higher level carrier) or in a multichip package (such as a ceramic carrier that has either or both surface interconnections or buried interconnections). The integrated circuit chip may be integrated with other chips, discrete circuit elements, and/or other signal processing devices as part of either (a) an intermediate product, such as a motherboard, or (b) an end product. The end product may be any product that includes the integrated circuit chips, ranging from toys and other low-end applications to advanced computer products having a display, a keyboard or other input device, and a central processor.

Figure 2:
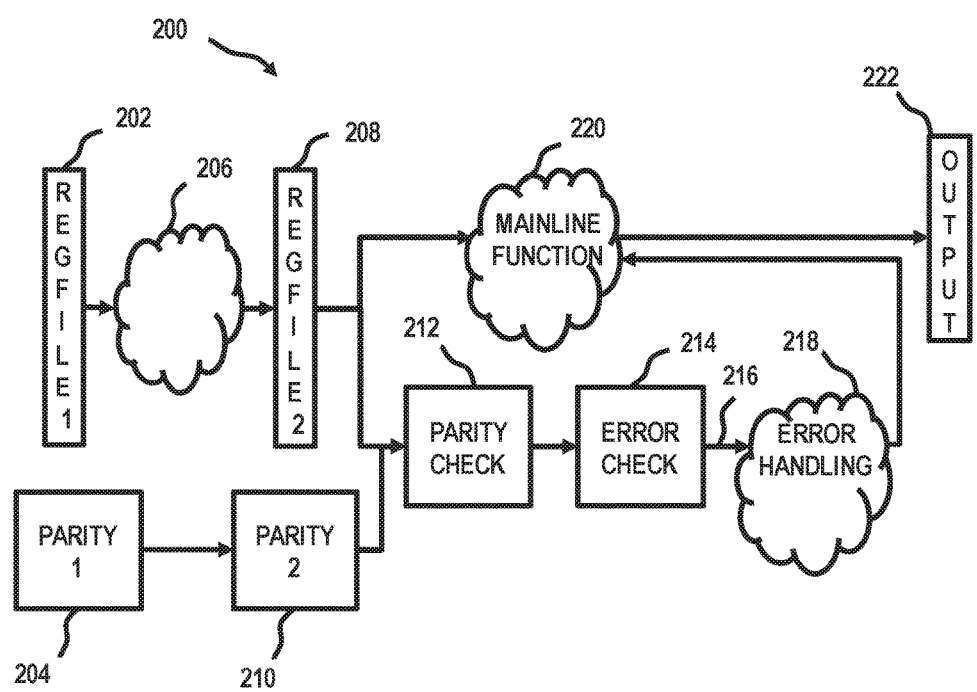
FIG. 2 is a functional block diagram illustrating an exemplary verification model program, in accordance with at least one embodiment of the present invention.

FIG. 2 is a functional block diagram illustrating an exemplary verification model program, in accordance with at least one embodiment of the present invention. The exemplary verification model program includes two register files: a first register file 202 and a second register file 208, both including a plurality of latches, i.e., circuit elements, for temporarily storing data in bit form. As indicated by additional functional circuit elements 206, additional functional circuit elements may be included and/or accessed for temporarily storing data. The first register file 202 is assigned with a first parity bit stored in parity circuit element 204. The second register file 208 is assigned with a second parity bit stored in parity circuit element 210. The parity circuit element 204, and additional functional circuit elements 206 may be provided as separated elements or they may be part of the first register file 202 and/or the second register file 208. In block 212 the parity circuit element 204 and parity circuit element 210 are checked. That is, it is checked whether the assigned parities stored in the parity circuit element 204 and the parity circuit element 210 are identical with a parity in the first register file 202 and the second register file 208. Parities, similar to the parity circuit element 204 and the parity circuit element 210 are assigned. This parity check is used in an error checking element 214 for error detection. In some embodiments, the parity circuit element 204 and the parity circuit element 210 are identical to a parity of bits stored in the first register file 202 and/or the second register file 208 to which the parity circuit element 204 and the parity circuit element 210 are assigned. In some embodiments, stored and actual parity bits are both even or both odd. In such embodiments, no error is detected. For each actual parity that deviates from a stored parity within the parity circuit element 204 or the parity circuit element 210, an error is detected by the error checking element 214. In such an example, a respective error report may be generated and a respective error report signal may be sent to an error handling structure 218 within the exemplary verification model program 200 via an error report signal path 216.

The parity circuit element 204 and the parity circuit element 210 may be further connected with a mainline function structure 220, which is of an electronic circuit. The mainline function structure 220 may use data temporarily stored in the first register file 202, and/or the second register file 208 to perform computational tasks. According to the embodiment shown, the error handling structure 218 may be connected with the mainline function structure 220 and may provide the mainline function structure 220 with corrected or otherwise updated data values, responsive to errors being detected by the error checking element 214. In some embodiments, the error handling structure 218 may be connected with the output 222 of the exemplary verification model program 200 of the electronic circuit. According to embodiments, the error handling structure 218 may exclusively or additionally be connected with an additional output (not shown).

Figure 3:
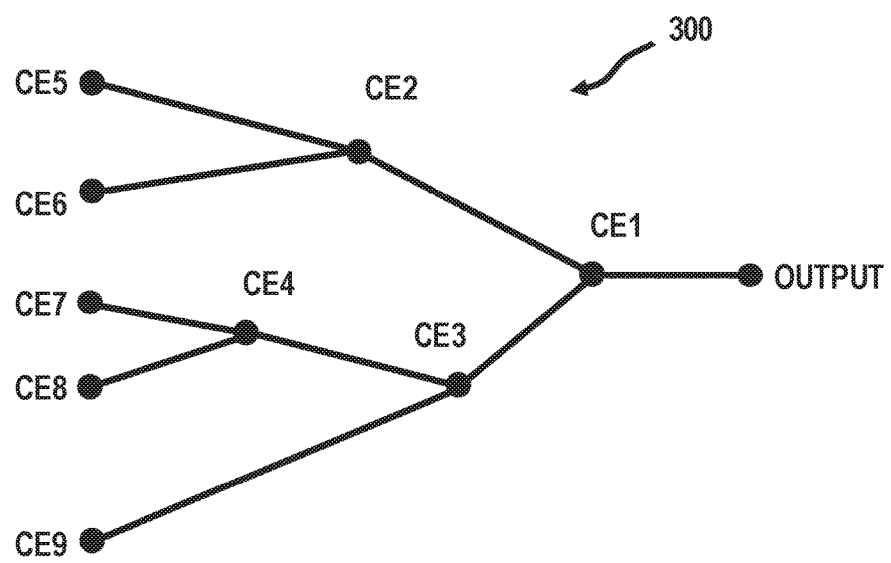
FIG. 3 is a tree diagram illustrating logic for a cone of influence for an exemplary verification model program, in accordance with at least one embodiment of the present invention.

FIG. 3 is an exemplary tree diagram illustrating logic for a cone of influence in accordance with at least one embodiment of the present invention. A cones of influence may be used for generating lists of circuit elements to influence an output of a circuit, such as the output 222. A cone of influence may have a tree structure, as illustrated in FIG. 3. A tree structure refers to a data structure with a plurality of interlinked nodes, where any two nodes are connected by exactly one tree path. The nodes may resemble circuit elements. Links between the nodes may resemble wires that structurally connect circuit elements. The tree structure may have one root node, (output) from which all tree paths start. In embodiments where the tree structure has more than one output, the outputs may be combined by a common signal sink providing a single root node. In some embodiments, a cone of influence may be provided for each output of a verification model program, such as the exemplary verification model program 200, representing an electronic circuit with each output being resembled by an individual root node of an individual cone of influence. A cone of influence may be provided for each circuit element. In such an embodiment, the circuit element may be considered the root node of the cone of influence. In some embodiments, a verification model program may include an energy consumption cost for each of the circuit elements. For example, a verification model program may include how many electrical energy units a circuit element uses and/or requires to perform a process. A cone of influence may be an input cone of influence or an output cone of influence. An input cone of influence may be for a given output or for a circuit element including all circuit elements which are structurally and/or logically connected with an output or circuit element via a wire for transmitting signals to the output or circuit element. An output cone of influence may be for a given circuit element including all circuit elements which are structurally and/or logically connected with the circuit element via a wire for transmitting signals from the circuit element.

In FIG. 3 the exemplary cone of influence 300 is an input cone of influence. The exemplary cone of influence 300 includes nine circuit elements CE1 to CE9, each circuit element being represented by a node of the exemplary cone of influence 300. By following all structural connections, (electrically conductive links), that are leading to the root node, (the output), the exemplary cone of influence 300 may be generated. In some embodiments, one or more circuit elements are not connected with any output of the respective circuit. For example, elements may not be wired together with the circuit and not wired with any of the other circuit elements connected with the outputs. In such an embodiment, non-connected circuit elements are neglected by the exemplary cone of influence 300.

Some circuit elements, for example, CE2, is a switchable element. For example, CE2 may be a multiplexer element which may be configured to switch between a first state (connecting CE5 with CE1) and a second state (connecting CE6 with CE1). In such an embodiment, both circuit elements CE5 and CE6 are connectable to the output via CE2 and CE1. Thus, both circuit elements CE5 and CE6 are part of the cone of influence 300. However, in other embodiments, a logical structure of the electronic circuit may be represented by a verification model program, such as the exemplary verification model program 200, such that only one connection state is logically operational and such that the alternative switch state is illogical. In such an embodiment, an illogical switch state may be neglected, when generating a cone of influence.

Figure 4:
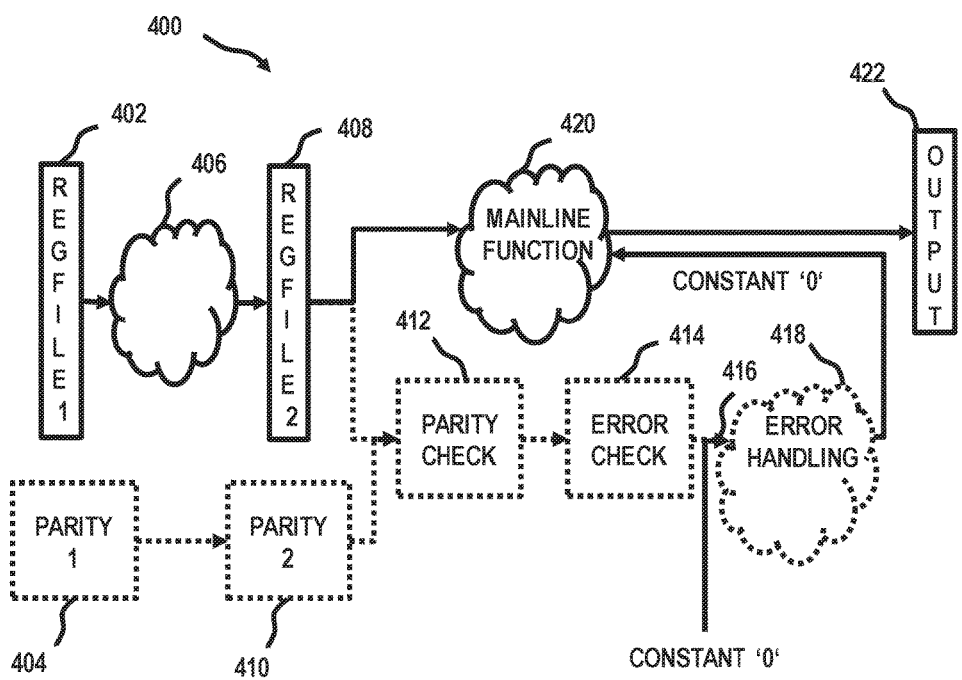
FIG. 4 is a functional block diagram illustrating an exemplary verification model program with circuit element output being held constant, in accordance with at least one embodiment of the present invention.

FIG. 4 is a functional block diagram illustrating an exemplary verification model program with circuit element output being held constant, in accordance with at least one embodiment of the present invention. FIG. 4 shows a second schematic diagram illustrating a verification model program 400, which is similar to the exemplary verification model program 200 of FIG. 2. The verification model program 400 has an error report signal path 416 that is similar to the error report signal path 216, but the error report signal path 416 is disabled. The error report signal path 416 may be disabled by having a fixed signal value assigned to it. The fixed signal value may be a constant '0' (shown) or a constant '1' (not shown). This is to set output for the circuit element to be constant. Signals from circuit elements included by an input cone of influence for the error report signal path 416 have no influence on a value generated as the error report signal path 416. Circuit elements included by the input cone of influence for the error report signal path 416 may be structurally connected with the error report signal path 416, but have a fixed value when output 422 is generated. The output 422, may receive trivial, constant, and otherwise non-influencing input from circuit elements 414, 412, 410, and 404. The trivial, constant, and otherwise non-influencing input from circuit elements 414, 412, 410, and 404 are indicated by dotted lines. In some embodiments, an error handling structure 418 may be trivial, constant, and otherwise non-influencing. In such an embodiment, the error handling structure 418 may include signals of error handling structure 418, with output from the error handling structure 418 being set to the fixed signal value.

Figure 5:
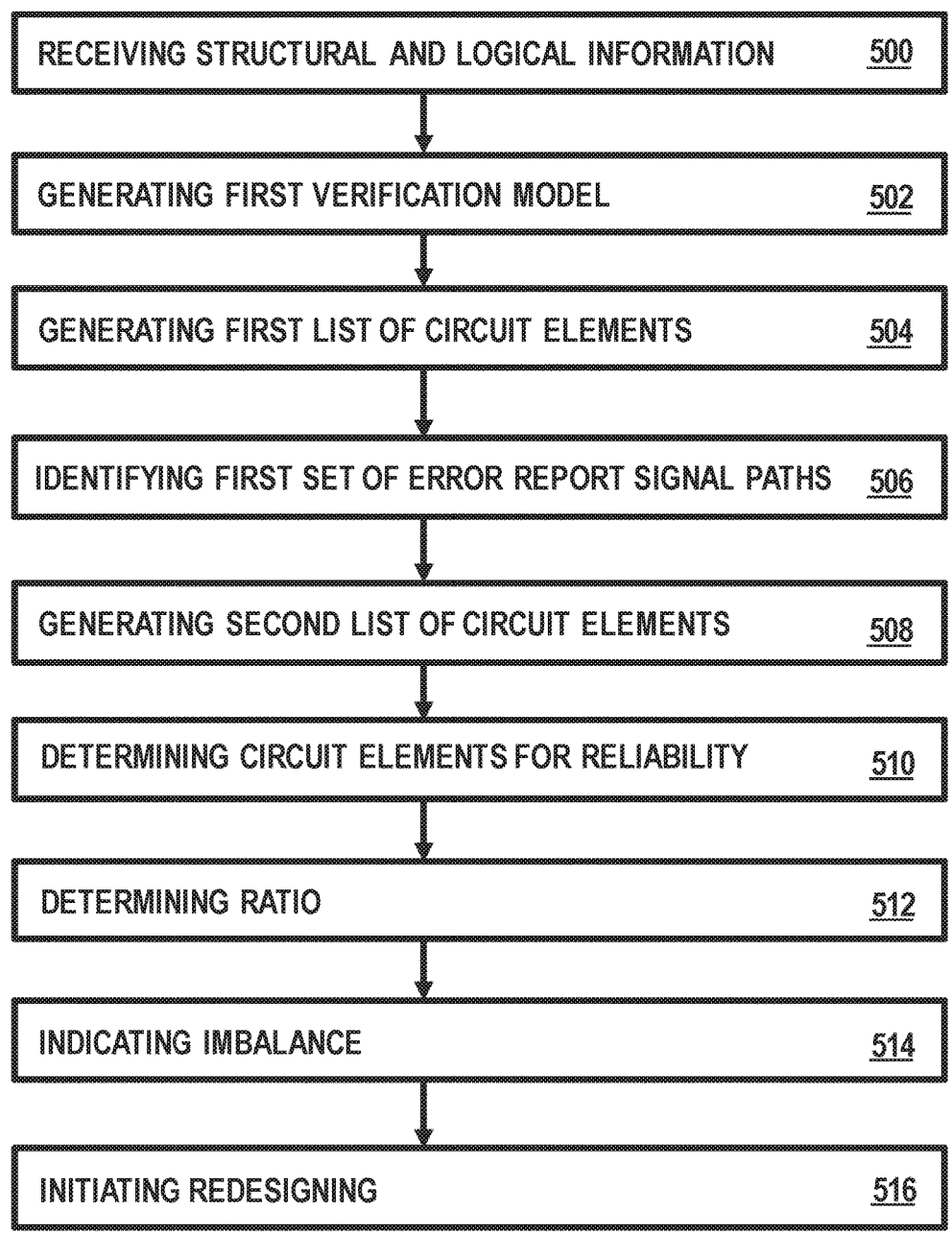
FIG. 5 is a flowchart diagram illustrating operational steps of a verification model program, in accordance with at least one embodiment of the present invention.

FIG. 5 depicts operational steps of a verification model program in accordance with at least one embodiment of the present invention. FIG. 5 shows a schematic block diagram of an exemplary method for determining the number of circuit elements dedicated to circuit reliability. At step 500 the method acts by receiving structural and logical information about the design of the electronic circuit. At step 502, a first formal computer-implemented verification model program of the respective design of the electronic circuit using the respective structural and logical information is generated. The verification model program may be generated by a common signal sink across all outputs of the electronic circuit providing an artificial single output for the first verification model program. At step 504, a first list of all circuit elements is generated. The first list of circuit elements are circuit elements that are structurally and logically connected for a single output within the first formal computer-implemented verification model program. The respective circuit elements may be determined by identifying the cone of influence of the output, neglecting circuit elements that are logically not connected with the output, and selecting all the circuit elements included by the cone of influence.

At step 506, a first set of error report signal paths is identified. The first set of error report signal paths may include error report signal paths of the first verification model program. The first set of error report signal paths may be received separately or generated by analyzing the structural and logical information received at step 500. At step 508, a second list is generated. The second list is of circuit elements that are functionally connected with the of the first verification model program such the influence of the circuit elements has been assigned a fixed signal value. At step 510, the number of circuit elements dedicated to circuit reliability is determined using the number of the circuit elements included by the first and the second list. At step 512, a difference between the output of circuit elements dedicated to circuit reliability and the circuit elements of the second list may be calculated. At step 514 the difference may be indicated as an indication, responsive to the difference exceeding a predefined threshold. The predefined threshold may for example be taken from the interval of 15% to 18%. In such an example, if the difference between the output of circuit elements dedicated to circuit reliability and the output of elements of the second list is a 25% difference, such an difference may be indicated. The method may end at step 516. At step 516, a redesigning of the analyzed electronic circuit may be initiated, responsive to an imbalance being indicated at step 514.

In some embodiments, the redesigned circuit may be analyzed again. In such embodiments, the method may repeat steps 500-516 and stop this iterative process when a difference above the predefined threshold is no longer indicated at step 514. The respective method according of steps 500-516 may be applied to logical sub-blocks of the respective electronic circuit in order to analyze potential imbalances in more detail or to determine whether imbalances are given for logical sub-blocks, when considering the imbalance of the entire electronic circuit. Predefined sub-block specific thresholds may be used at step 514.

Figure 6:
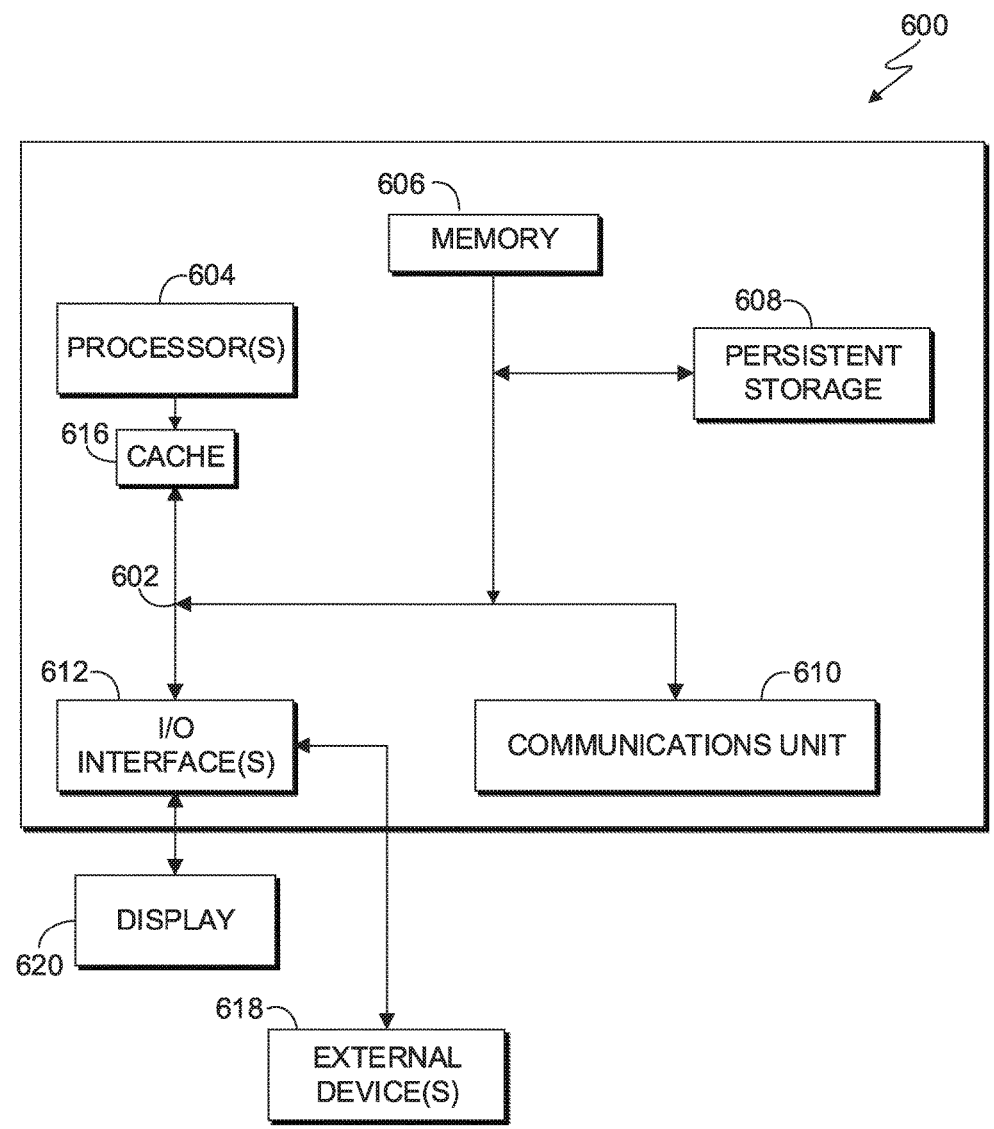
FIG. 6 is a block diagram of a computing apparatus suitable for executing the verification model program, in accordance with at least one embodiment of the present invention.

FIG. 6 is a block diagram depicting components of a computer 600 suitable for executing a verification model program. FIG. 6 displays the computer 600, the one or more computer processor(s) 604 (including one or more computer processors), the communications fabric 602, the memory 606, the RAM, the cache 616, the persistent storage 608, the communications unit 610, the I/O interface(s) 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the computer processor(s) 604 (e.g., microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the verification model program may be stored in the persistent storage 608 or in memory 606, or more generally, any computer readable storage media, for execution by one or more of the respective computer processor(s) 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions, computer program instructions, or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The verification model program may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface(s) 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying an electronic circuit, said electronic circuit comprising a plurality of circuit elements, said electronic circuit being based on a circuit design, said circuit design comprising structural information and logical information;
    generating a first verification model, said first verification model being for said circuit design, said verification model comprising a plurality of error report signal paths, each of said plurality of error report signal paths being for one of said plurality of circuit elements;
    identifying a first circuit element output, said first circuit element output being based on said plurality of error report signal paths;
    setting output for at least one of said first plurality of circuit elements to a fixed value;
    generating a second circuit element output, said second circuit element output being based on said plurality of error report signal paths, said second circuit element output being based on setting output for at least one of said first plurality of circuit elements to a fixed value; and
    determining a difference, said difference being between said first circuit element output and said second circuit element output.

2. The computer-implemented method of claim 1, wherein said electronic circuit includes virtual logical information.

3. The computer-implemented method of claim 1, wherein setting output for at least one of said first plurality of circuit elements to a fixed value is based on said logical information.

4. The computer-implemented method of claim 1, further comprising:
    receiving a predefined threshold;
    determining whether said difference is above said predefined threshold; and
    responsive to said difference being above said predefined threshold, generating an indication that said difference is above said predefined threshold.

5. The computer-implemented method of claim 1, wherein generating said first verification model further comprises identifying an energy consumption cost for each of said plurality of circuit elements.

6. The computer-implemented method of claim 1, further comprising identifying which of said plurality of circuit elements are dedicated to circuit reliability, based on which of said first plurality of circuit elements are being set to a fixed value.

* * * * *